Feb. 20, 1923.

C. E. MAYNARD.
TUBE STRIPPING NOZZLE.
FILED APR. 27, 1922.

1,445,701.

INVENTOR
Charles Edgar Maynard
BY
ATTORNEY

Patented Feb. 20, 1923.

1,445,701

UNITED STATES PATENT OFFICE.

CHARLES EDGAR MAYNARD, OF NORTHAMPTON, MASSACHUSETTS, ASSIGNOR TO THE FISK RUBBER COMPANY, OF CHICOPEE FALLS, MASSACHUSETTS, A CORPORATION OF MASSACHUSETTS.

TUBE-STRIPPING NOZZLE.

Application filed April 27, 1922. Serial No. 557,001.

*To all whom it may concern:*

Be it known that I, CHARLES EDGAR MAYNARD, a citizen of the United States of America, residing at Northampton, in the county of Hampshire and State of Massachusetts, have invented certain new and useful Improvements in a Tube-Stripping Nozzle, of which the following is a specification.

My present invention relates to an improved device for assisting in the stripping of rubber tubes from the mandrels upon which they have been vulcanized, and has for its object the provision of a device of this character by the use of which the stripping of tubes may be done more expeditiously than was formerly possible and without danger of marring the tube.

The invention will now be described with reference to the accompanying drawings, in which Fig. 1 illustrates the manner in which the device is used in stripping a tube;

Rubber tubes such as the inner tubes used in automobile tire casings are customarily vulcanized upon long cylindrical mandrels. After this vulcanization they are stripped from the mandrel and their ends are spliced and vulcanized together The tube is customarily inverted as it is stripped so as to bring to the outside the surface which was vulcanized on contact with the mandrel. This stripping operation has been accomplished by turning back a portion 10 (Fig. 1) of one end of the tube 11, holding the mandrel 12 as by supporting one end in a clamping block, admitting compressed air within the turned back portion of the tube through a nozzle indicated generally by 13 in Fig. 1, and then drawing the turned-over portion of the end of the tube towards the right in Fig. 1 so as to progressively invert the tube and strip it from the mandrel. The compressed air admitted through the nozzle stretches the turned back portion of the tube and forms a film between it and that part of the tube still in its original position on the mandrel, which greatly reduces the friction of the rubber surfaces. It is to a nozzle particularly adaptable for this purpose, although possessing utility in other directions as well, that my invention is directed.

Figure 1:
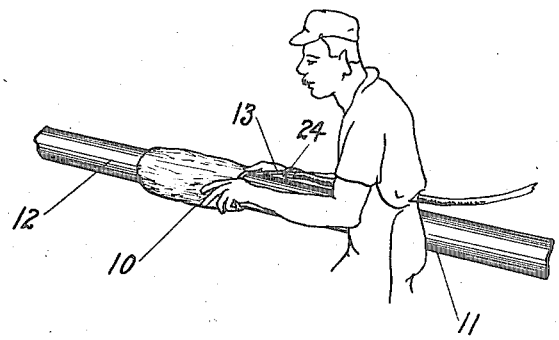
Figure 2:
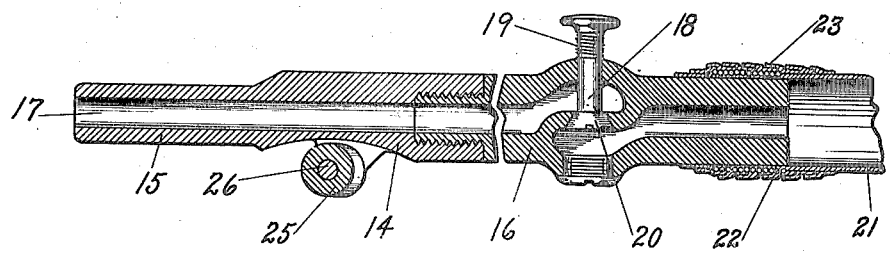
Fig. 2 is a longitudinal median section of the device.
Figure 3:
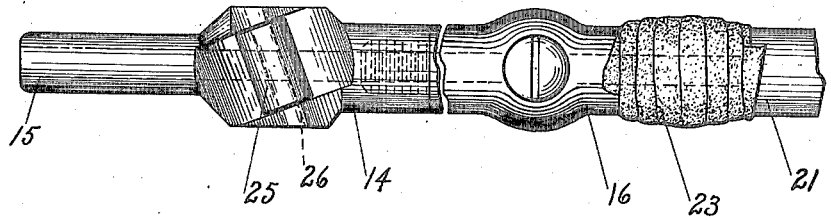
Fig. 3 is a bottom view thereof.
Figure 4:
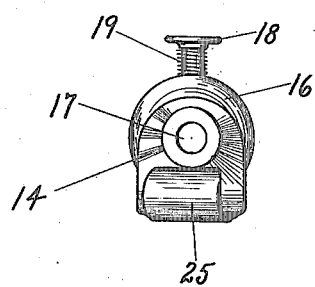
Fig. 4 is a view looking from the left in Figs. 2 and 3.

Referring now particularly to Figs. 2, 3, and 4, the improved nozzle made according to the preferred form of my invention has a body portion 14 having a tip 15, and having attached to it as by a threaded connection a handle 16. This latter part is conveniently made detachable as described in order to provide means for varying the length of handle as suited for different operators. These parts have a central connecting hole 17 by which compressed air may be ejected through tip 15 into the folded back part of the tube. A valve 18, spring pressed at 19 to keep closed an aperture 20 in the handle, serves to bring the flow of air under the control of the operator. A flexible hose 21, wired at 22 to the handle, serves to connect the nozzle to a suitable source of compressed air. The junction of the hose and handle may conveniently be taped as at 23 in order to cover the wire and present a suitable grip for the operator In the use of the device it is conveniently strapped to the wrist of the operator as indicated at 24 in Fig. 1, so that the operator has both hands free to grasp the turned back portion of the tube. Whether the nozzle is fastened in this position or is held in the operator's hand, its most convenient position is at an angle to the center line of the tube mandrel. I have according to my invention provided means whereby the nozzle can be moved along the surface of the tube as the latter is progressively stripped from the mandrel, without danger of marring the tube and with a minimum of friction. These features are accomplished by the provision of a roller 25, journaled at 26 in the body portion 14. The roller is angularly mounted, so that with the nozzle held at a convenient angle as shown in Fig. 1 it will tend to roll straight along the tube. The rolling contact so secured prevents the end of the nozzle from scraping or cutting the tube, directs the nozzle so that it tends to move straight along the tube, and greatly reduces the effort necessary on the part of the operator.

The manner of using my improved nozzle will be apparent from the above description. With the end of the mandrel held and the tube partly turned back on itself over the tip of the nozzle, the operator admits compressed air to within the turned back portion of the tube by manipulating valve 18, and walks back along the mandrel drawing with him the turned back tube end and the nozzle. By reason of the rolling contact provided and the angular mounting of the roller the nozzle will move easily and with a tendency to travel in a straight path along the tube.

Having thus described my invention, I claim:

1. A nozzle adapted for use in tube stripping having a tip through which air may be ejected, a valve adapted to control the flow of air, and an angularly disposed roller journaled upon the nozzle and adapted to support the same upon the tube surface.

2. A nozzle adapted for use in tube stripping having a tip through which air may be ejected, a valve adapted to control the flow of air, and a roller journaled upon the nozzle and adapted to support the same upon the tube surface.

3. A nozzle adapted for use in tube stripping having a roller mounting adapted to support it upon the tube surface.

4. A nozzle adapted for use in tube stripping having a support adapted to permit its movement in a direction at an angle to its length.

5. A nozzle adapted for use in tube stripping having an angularly mounted roller thereon.

CHARLES EDGAR MAYNARD.